(12) United States Patent
Kwast et al.

(10) Patent No.: US 10,139,063 B2
(45) Date of Patent: Nov. 27, 2018

(54) DUAL-CONDUCTOR SUSPENSION SYSTEM FOR AN ELECTRICAL APPARATUS

(71) Applicant: Griplock Systems, LLC, Carpinteria, CA (US)

(72) Inventors: Ryan Kwast, Santa Barbara, CA (US); Hugo Napier, Santa Barbara, CA (US)

(73) Assignee: Griplock Systems, LLC, Carpinteria, CA (US)

( * ) Notice: Subject to any disclaimer, the term of this patent is extended or adjusted under 35 U.S.C. 154(b) by 115 days.

(21) Appl. No.: 14/995,038

(22) Filed: Jan. 13, 2016

(65) Prior Publication Data

US 2016/0201863 A1 Jul. 14, 2016

Related U.S. Application Data (60) Provisional application No. 62/102,957, filed on Jan. 13, 2015, provisional application No. 62/154,241, filed on Apr. 29, 2015.

(51) Int. Cl.

| | |
|---|---|
| *F21S 8/06* | (2006.01) |
| *H02G 3/06* | (2006.01) |
| *H02G 3/08* | (2006.01) |
| *F21V 21/112* | (2006.01) |
| *F21V 23/00* | (2015.01) |
| *F21V 21/104* | (2006.01) |
| *F21Y 115/10* | (2016.01) |

(52) U.S. Cl.
CPC ............... *F21S 8/06* (2013.01); *F21V 21/112* (2013.01); *F21V 23/001* (2013.01); *H02G 3/0675* (2013.01); *H02G 3/083* (2013.01); *F21V 21/104* (2013.01); *F21Y 2115/10* (2016.08)

(58) Field of Classification Search
USPC ............... 362/184; 174/102 R, 527; 248/343
See application file for complete search history.

(56) References Cited

U.S. PATENT DOCUMENTS

| | | |
|---|---|---|
| 5,461,200 A | 10/1995 | Norcia |
| 6,343,172 B1 | 1/2002 | Schiestle et al. |

(Continued)

OTHER PUBLICATIONS

"International Search Report and Written Opinion" for Application No. PCT/US2016/013297 dated Jun. 3, 2016, 14 pages.

*Primary Examiner* — William H Mayo, III
*Assistant Examiner* — Krystal Robinson
(74) *Attorney, Agent, or Firm* — Helsell Fetterman LLP; Lance D. Reich (57) ABSTRACT

A system for suspending and powering an electrically-powered fixture, such as a luminaire, with a coaxial suspension cable, and for attaching the fixture to the cable and to a structure, such as a ceiling, using at least one cable gripping devices, such that the height of the fixture may be adjusted. The suspension cable may comprise an inner cable, which may include a plurality of strength strands wound around a conductive strand; and an outer conductor, such as a copper mesh, separated from the inner cable by an insulator layer. The system may include an assembly mounted to the structure and an assembly mounted to the fixture, each assembly configured to grip the inner cable at one end of the suspension cable and to allow a first conductive path to the inner cable and a second conductive path, insulated from the first conductive path, along the outer conductor.

21 Claims, 11 Drawing Sheets

(56) References Cited

U.S. PATENT DOCUMENTS

| | | | |
|---|---|---|---|
| 6,761,342 B1 * | 7/2004 | Giefer | F21S 8/061 248/328 |
| 7,611,373 B1 | 11/2009 | LaSalvia | |
| 8,807,780 B2 * | 8/2014 | Napier | F21V 21/104 174/110 R |
| 2004/0055780 A1 | 3/2004 | Hakkarainen et al. | |
| 2006/0000634 A1 | 1/2006 | Arakawa | |
| 2011/0122608 A1 * | 5/2011 | Napier | F21V 21/104 362/184 |
| 2013/0023151 A1 | 1/2013 | Holliday et al. | |
| 2013/0127288 A1 | 5/2013 | Hamer et al. | |

* cited by examiner

DUAL-CONDUCTOR SUSPENSION SYSTEM FOR AN ELECTRICAL APPARATUS

CROSS-REFERENCE TO RELATED APPLICATION

This application claims the benefit of the following provisional patent applications: U.S. Provisional Application No. 62/102,957, filed on Jan. 13, 2015; U.S. Provisional Application No. 62/154,241, filed Apr. 29, 2015; and U.S. Provisional Application No. 62/260,107, filed Nov. 25, 2015, all of which are incorporated herein by this reference in their entirety.

BACKGROUND

Many electrically-powered assemblies and devices, such as luminaire assemblies, are hung from ceilings or other supporting structures. In order for a luminaire assembly to be hung, the weight of the luminaire assembly must be supported from the supporting structure. In addition, in order to provide light, the luminaire assembly must be provided with power.

Many kinds of supports have been developed to suspend luminaire assemblies and to provide them with power. In recent years, conductive suspension cable systems have been developed for suspending and powering low voltage lighting fixtures, such as light-emitting diode (LED) luminaires, via conductive suspension cables, while also allowing height adjustability during installation via the usage of cable grippers. This development has allowed the adjustable suspension of luminaire assemblies of up to 100 pounds working load (500 pounds break strength), without the need for a separate power cord.

Architects, designers, and homeowners often consider a variety of lighting fixtures when designing the interior of a property and in many instances may prefer luminaire assemblies with adjustable suspension systems that require fewer suspension cables than those of other luminaire assemblies. This preference may be for aesthetic purposes or to provide lighting suspended from a smaller area on a ceiling.

However, each luminaire assembly may require at least two conductors. Prior suspension cable systems have been able to power luminaire and other electrical assemblies with cords that utilize two conductors. However, these prior suspension cable systems may not allow adjustability using cable grippers because cable grippers are designed to grip only one cable at a time and because cable grippers need to come into direct and conductive contact with a metallic cable to be effective. The first reason for these constraints is that when a cable gripper is used on a non-metallically insulated cable, its ball bearings or other gripper mechanism which surrounds and applies lateral compression upon the gripped cable, would likely tear the insulation while a user attempts adjustment, which would lodge the metallic ball bearings against the conductor itself, defeating the purpose of the insulation. Additionally, even if tearing does not occur, the gripper may easily slip on the non-metallic insulation, which would defeat the purpose of the gripper. Therefore, prior suspension systems that provide adjustability with cable grippers have required at least two single-conductor suspension cables.

Some suspension systems, such as those utilizing a crimp system, have provided limited adjustability to the height of suspended fixtures during installation. However, these options may be unattractive for various reasons. For example, adjustment of a suspension cable may require cutting and restriping a suspension cable, which may render useless the previously used crimp.

SUMMARY OF THE INVENTION

This disclosure is related to techniques for providing a dual-conductor cabling system for suspending an electrically-powered fixture, such as a luminaire, and for attaching the fixture to the cable and to a junction box mounted to a structure, such as a ceiling, while utilizing cable gripping devices in such a way that the height of the fixture may be adjusted during installation. A dual-conductor suspension system of the invention may allow an electrically powered apparatus such as a luminaire assembly to be powered and suspended with one suspension cable, while also allowing adjustability during installation using cable grippers. The disclosed system provides assemblies that dielectrically separate the two conductors of a suspension cable, which may be a coaxial cable, allowing the coaxial cable to conduct current along separate conductive paths between an electrical driver in a ceiling-mounted junction box and an electrical circuit board in an electrical fixture suspended by the cable using cable gripping.

Specifically, the coaxial cable may conduct one conductive path along an inner conductor, such as an aircraft cable, and a second conductive path along an outer conductor, such as a copper mesh, which may be separated dielectrically from the first conductive path via an insulator such as plastic layer.

The suspension cable may include an inner cable, which may include plurality of strength strands wound around a conductive strand; an insulating layer, such as a plastic insulator, uniformly surrounding an inner conductor; and an outer conductor, such as a copper mesh, surrounding the plastic insulator. When conductively connected to a suspension system of the invention, the inner cable may conduct an inner conductive path and the outer cable may conduct an outer conductive path dielectrically separated from the inner conductive path.

The system may include mount assemblies, such as a fixture-side assembly and a structure-side assembly, each of which may be configured to allow an inner conductive path from a driver to an electrical device in a fixture as well as an outer conductive path from the electrical device to the driver. The mount assemblies may be configured to insulate the inner conductive path from the outer current path. For example, a fixture-side assembly may include inner conductor connective components, at least one of which may be conductively coupled to the outer conductor, that provide a series of conductive connections that allow the inner conductor to pass to one terminal of an electrical device separately from the electrical device's other terminal.

Accordingly, the suspension system of the invention may allow a luminaire, such as an LED lighting fixture, to be powered with a single cable, which may provide attractive options to architects, designers, and homeowners when they are considering luminaires to be installed in the interior of a property. In some embodiments, the suspension system of the invention may allow the powering of a separate LED arrays for each dual-conductor cable, used in an adjustable suspension system. This may allow lighting fixtures with the capability for more complex lighting systems with fewer cables than may have been required using single-conductor suspension cabling systems with cable gripping.

Accordingly, a user may adjust the suspension height of a fixture suspended by a suspension system of the invention by cutting the coaxial cable to an appropriate length and stripping the cable such that the outer conductor of the cable may be held in contact with the appropriate components of the assembly and such that the ball bearings of the gripper are in contact with the inner cable of the coaxial cable. The inner cable's strength strands surround the conductive strands of the inner conductor and provide lateral compressive strength and tensile strength, which allow the inner cable to be effectively locked into place by the gripper without damage to the inner conductor.

However, some embodiments may conductively couple and fasten an inner cable to a mount assembly without a gripper. For example, the inner cable may be fastened by a method such as a clamp, screw, weld, conductive adhesive, or other method that allows the inner cable to be in conductive contact with at least one conductive component of the mount assembly. In addition, some embodiments may conductively couple and fasten the outer conductor to a mount assembly using a method other than wrapping the outer conductor around a portion of the mount assembly. For example, the outer conductor may be fastened by a method such as a clamp, screw, weld, conductive adhesive, or other method that allows the outer conductor to be in conductive contact with at least one conductive component of the mount assembly. In various embodiments, one side of a suspension cable may be fastened by a gripper device while the other side of the suspension cable is fastened by another fastening method.

The electrical assembly may be powered by a remote power source. The power source may be configured to provide a positive 60-volt or less direct current feed via the inner conductive path and to provide a negative 60-volt or less direct current feed via the outer conductive path. Specifically, some embodiments may utilize National Electric Code (NEC) class 2 systems. Accordingly, these systems would be limited to 60V DC or 42.4V AC and 100 W total power with current not to exceed 5×V.

BRIEF DESCRIPTION OF THE DRAWINGS

The Detailed Description is set forth with reference to the accompanying figures.

DETAILED DESCRIPTION

Figure 1:
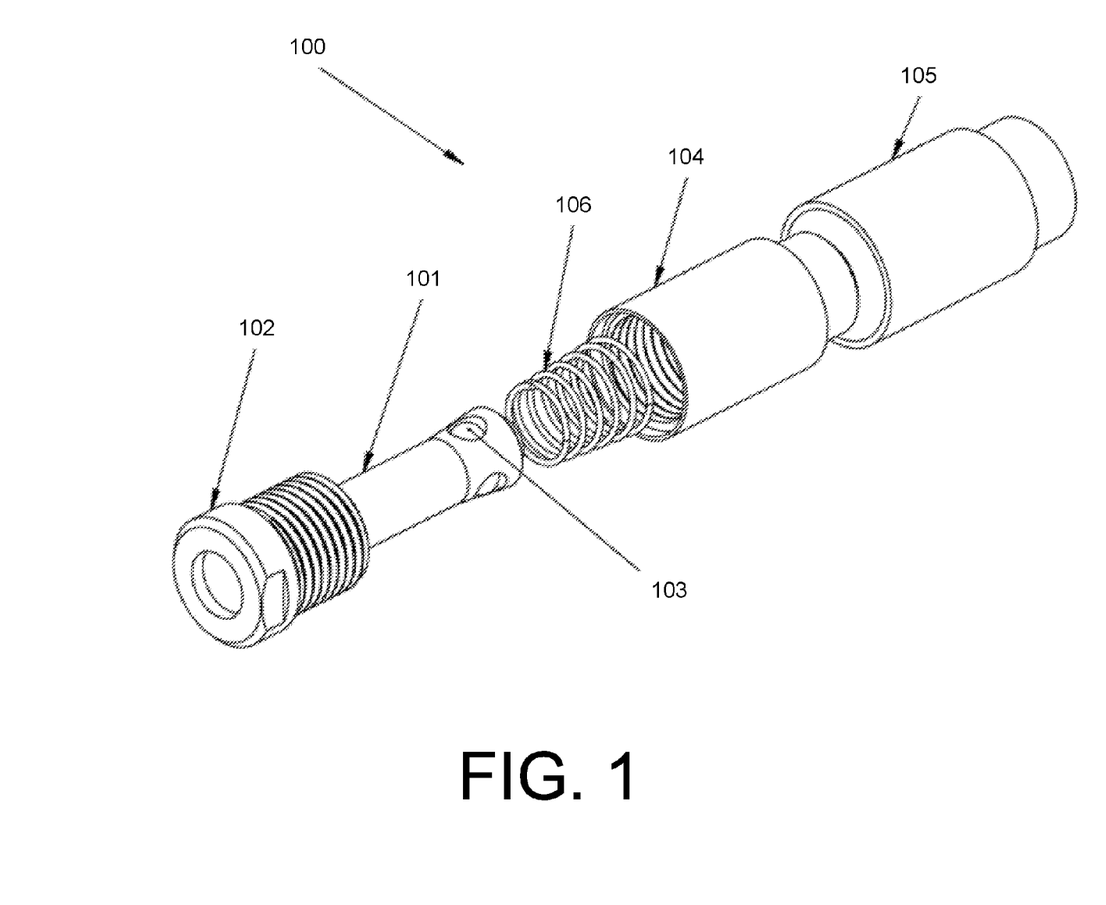
FIG. 1 depicts an exploded view of an exemplary cable gripper device used in a dual-conductor suspension system for an electrical apparatus.

FIG. 1 shows an exploded view of an exemplary three-ball cable gripper device assembly 100 used in a dual-conductor suspension system for an electrical apparatus. A cable gripper device may grip a suspension cable to allow a fixture to be hung from a structure such as a ceiling Gripper component 101 may have a cylindrical opening for allowing a cable to pass through, and an internal conical cylinder shape for containing a plurality of ball bearings 103. Gripper component 102 may be a threaded component and may have a circular opening for allowing gripper component 101 to pass through until stopped by the outer conical cylinder surface of gripper component 101. Gripper housing 104 may be a cylindrical threaded element having threading along its inner wall into which gripper component 102 may thread. Additionally, gripper housing 104 may include an inner stop flange. Gripper component 101, gripper component 102, ball bearings 103 and gripper housing 104 may be made of a metal such as brass. Spring 106 may be a spring made of a metal such as steel or stainless steel. Gripper insulator component 105 may be a cylindrical insulator made of plastic that may be press fit around gripper housing 104.

Figure 2:
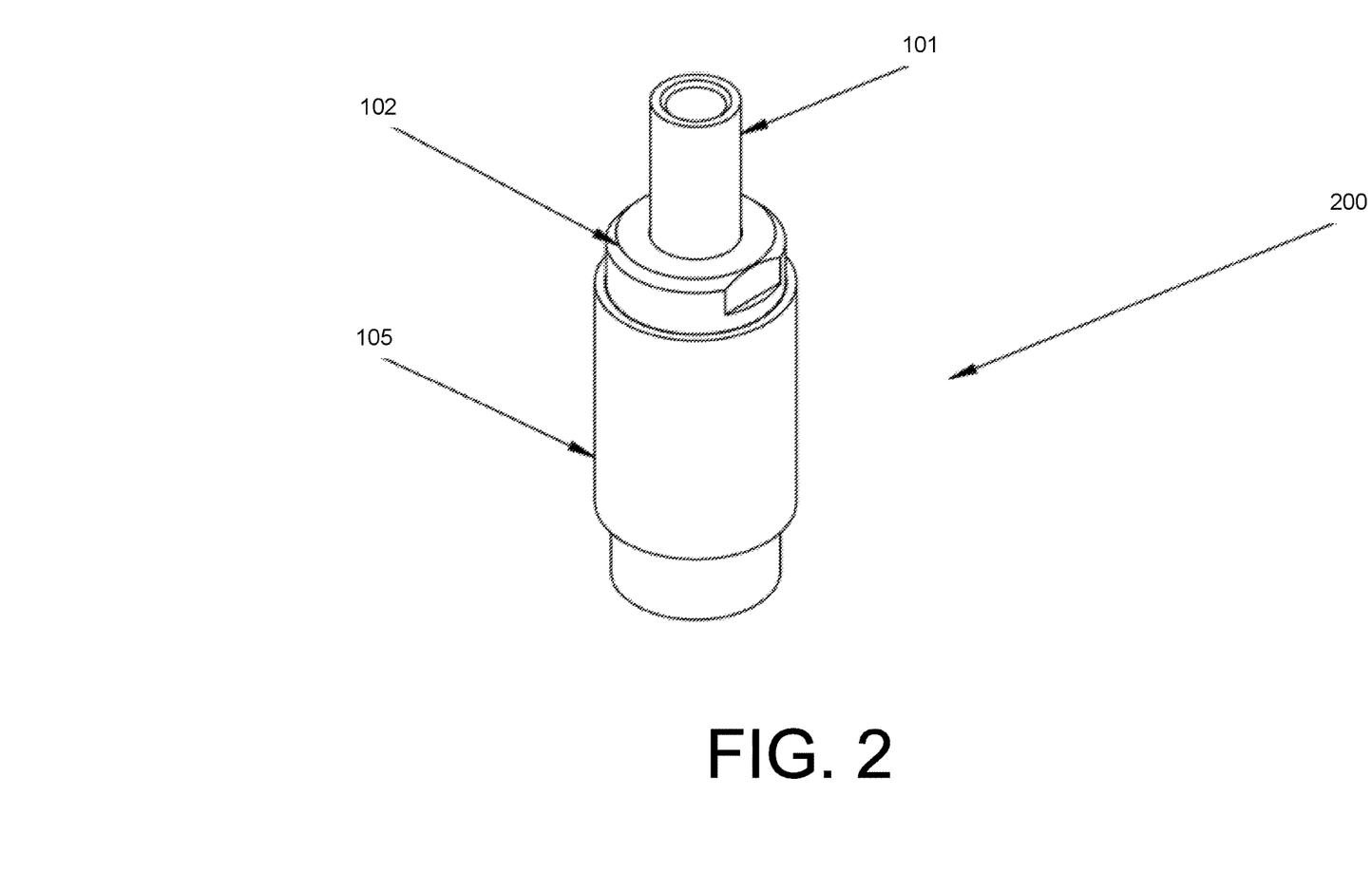
FIG. 2 depicts an assembled view of an exemplary cable gripper device used in a dual-conductor suspension system for an electrical apparatus.

FIG. 2 shows the assembled view 200 of the gripper device assembly 100. Gripper component 101 has been fit through gripper component 102, which has screwed into gripper housing 104, which, in turn, has been surrounded by gripper insulator component 105. Gripper device assembly 100 may allow a cable to pass into the hole of gripper component 101, such that the cable may be gripped. Specifically, if a downward force is exerted on the cable, thereby pushing the cable into the gripper device assembly, the cable will transmit the downward force on the internal conical cylinder of gripper component 101. This downward force on causes the ball bearings 103 to be compressed against inner wall of gripper component 102 and around the cable, thereby causing a lateral force applied by each ball toward the axis of the cable. These lateral forces prevent the cable from moving in the opposite direction, despite a force that may be pulling the cable upward.

However, an operator may press downward upon the exposed portion of gripper component 101 to be able to adjust the cable upward. Specifically, the force may be transferred to spring 106, which is stopped by the inner stop flange of gripper housing 104, thereby allowing the downward motion of gripper component 101. The downward motion of 101 allows the decompression of the ball bearings around the cable, thereby allowing an operator to adjust the cable until the operator removes the downward force upon gripper component 101.

Figure 3:
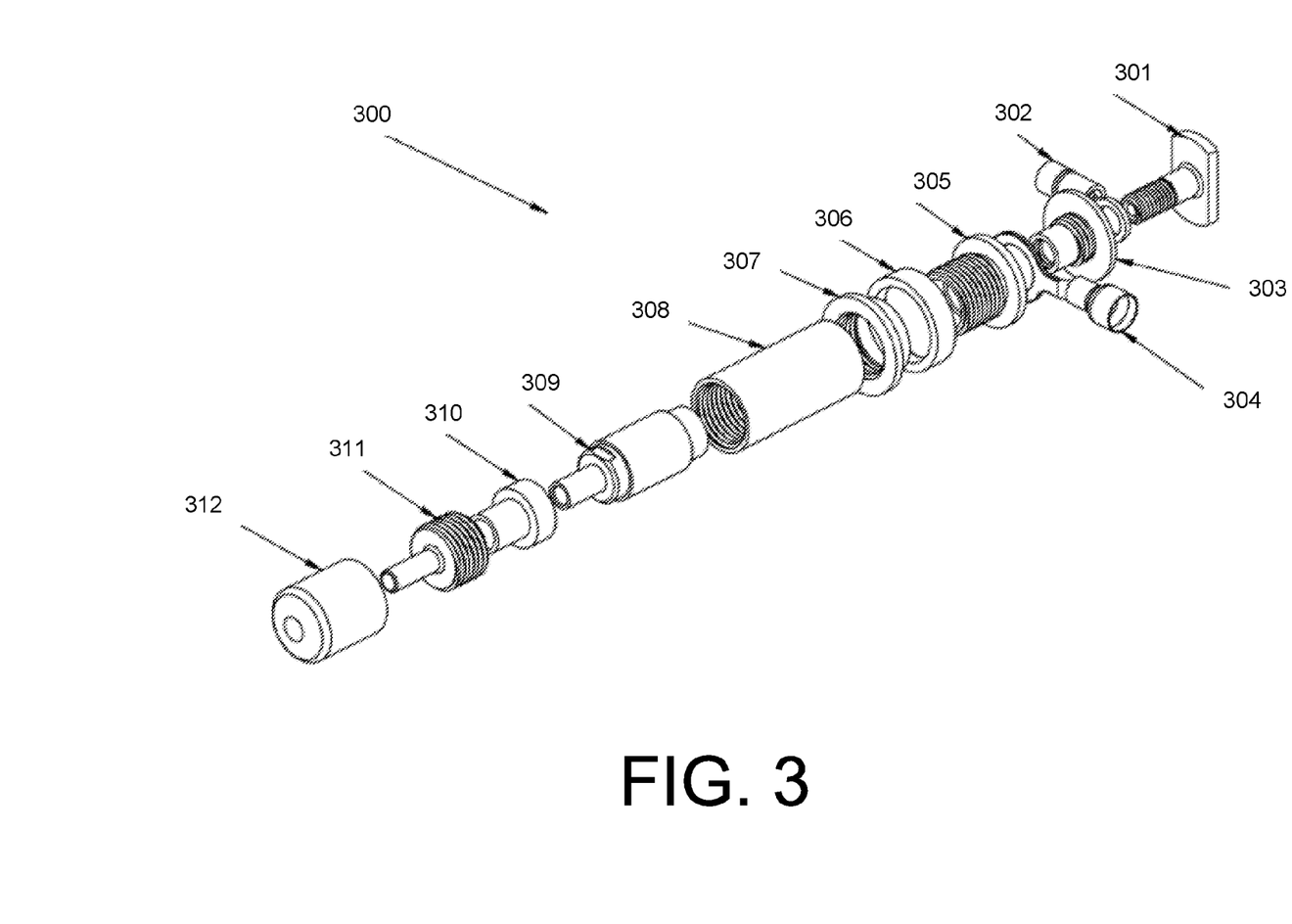
FIG. 3 depicts an exploded view of a hardware assembly that may be used to mount to a lighting fixture or other suspended apparatus that requires power.

FIG. 3 is an exploded view 300 of the hardware assembly that may be used to mount to a lighting fixture or other suspended apparatus that requires power. Inner conductor connective component 301 and outer conductor connective components 305, 308, 311, and 312 may be made of a metal such as brass or another conductive material, metal or non-metal. Insulator components 303, 306, 307, and 310 may be made of plastic, or another non-conductive material such as silicon or composite. Ring terminal connectors 302 and 304 may be standard electrical ring terminal connectors. Fixture-side gripper assembly 309 may be a gripper device assembly as discussed in FIG. 1 and FIG. 2.

Figure 4:
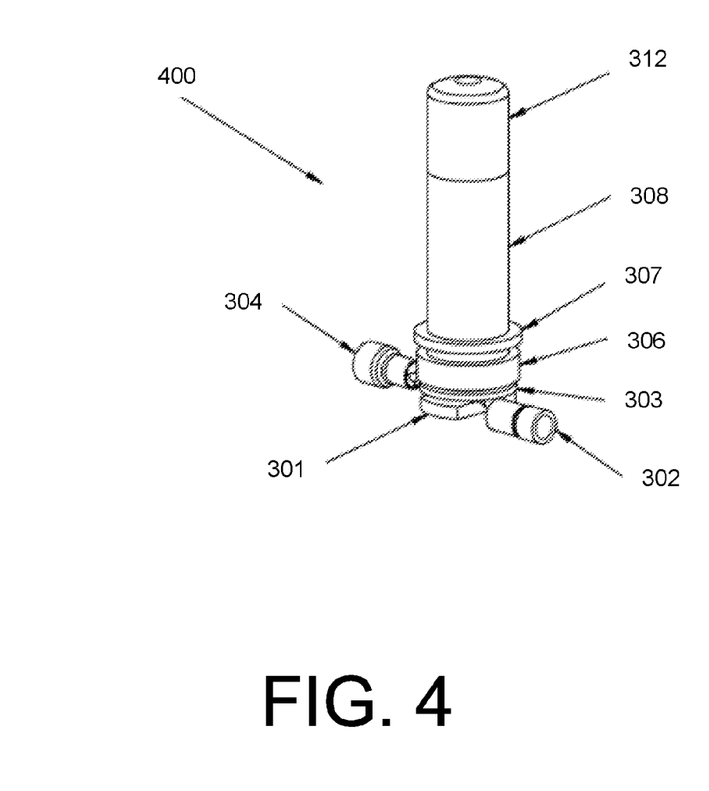
FIG. 4 may be the assembled version of a hardware assembly that may be used to mount to a lighting fixture or other suspended apparatus that requires power.

FIG. 4 is an assembled version of the fixture-side assembly 400. Inner conductor connective component 301 may include a threaded body, which may screw into a threaded inner wall of a component of gripper assembly 309. Outer conductor connective component 305 may include a threaded element that may screw into the inner threading of outer conductor connective component 308 and insulator component 307. Outer conductor connective component 308 may fit around the insulation of gripper assembly 309, thereby keeping outer conductor connective component 308 dielectrically separated from the conductive components of gripper assembly 309. Outer conductor connective component 311 may include a threaded body, which may additionally screw into the inner threaded wall of outer conductor connective component 308. Outer conductor connective component 311 may further include an unthreaded cylindrical extrusion. Outer conductor connective component 312 may include an inner threaded body that may screw around the threading of outer conductor connective component 311.

Insulator component 303 may dielectrically separate inner conductor connective component 301 and ring terminal connector 302 from ring terminal connector 304 and outer conductor connective component 305. Insulator component 306 may be an insulator washer and insulator component 307 may be an insulator shoulder washer. Insulator components 306 and 307 may dielectrically separate outer conductor connective component 308 from a fixture housing that may have a circular opening held into place between insulator components 306 and 307. Insulator component 310 may dielectrically separate outer conductor connective component 311 from the conductive components of gripper assembly 309.

Accordingly, an assembled fixture-side assembly 400 may provide two conductive paths dielectrically separated from one another. The first conductive path may be provided by the conductive contact between the conductive components of gripper assembly 309, inner conductor connective component 301, and ring terminal connector 302. The second conductive path may be provided by the conductive contact between outer conductor connective component 312, 311, 308, and 305, and ring terminal connector 304. The fixture-side assembly 400 may be configured such that dielectric separation between the two conductive paths is provided by insulator components 303, 306, 307, and 310, and the insulator component surrounding the housing of gripper assembly 309.

Figure 5:
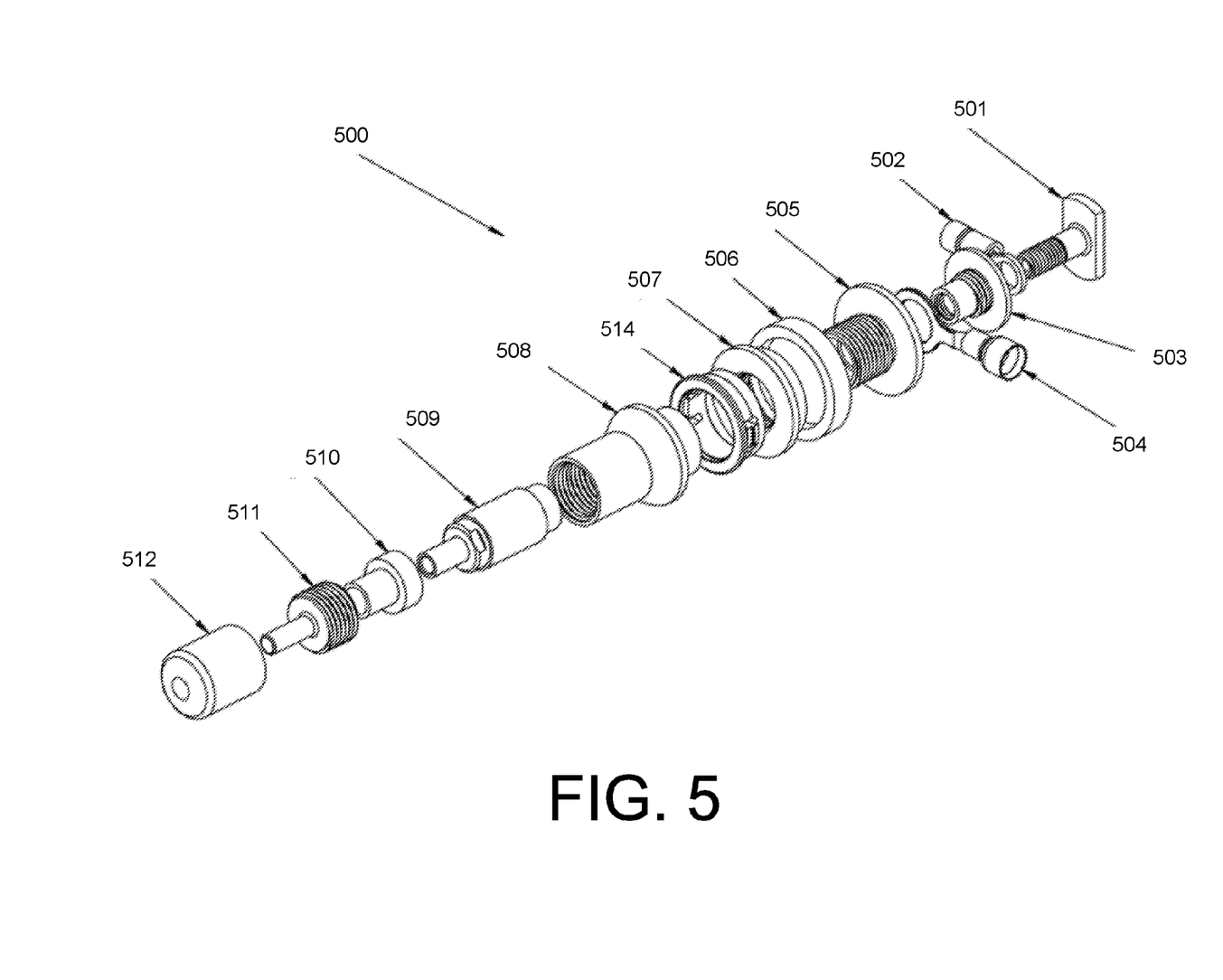
FIG. 5 is an exploded view of a hardware assembly that may be used to mount to a ceiling a cable that suspends a lighting fixture or other suspended apparatus that requires power.

FIG. 5 is an exploded view 500 of the hardware assembly that may be used to mount to the ceiling. Inner conductor connective component 501 and outer conductor connective components, 505, 508, 511, and 512 may be made of brass or other conductive material, metallic or non-metallic. Insulator components 503, 506, 507, 510, and 514 may be made of plastic or other non-conductive material. Ring terminal connectors 502 and 504 may be standard electrical ring terminal connectors. Gripper assembly 509 may be a gripper assembly as discussed in FIG. 1 and FIG. 2.

Figure 6:
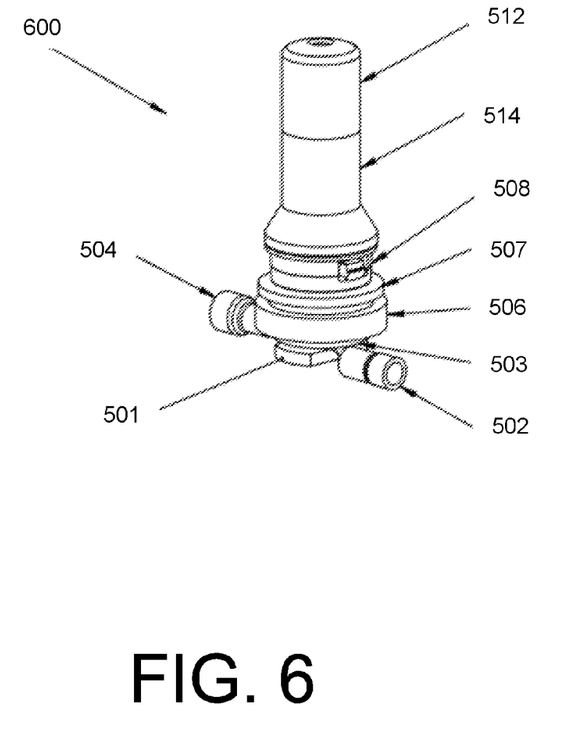
FIG. 6 is the assembled version of a hardware assembly that may be used to mount to a ceiling a cable that suspends a lighting fixture or other suspended apparatus that requires power.

FIG. 6 is the assembled version of the ceiling-side assembly 600. Inner conductor connective component 501 may include a threaded body, which may screw into a threaded inner wall of a component of gripper assembly 509. Outer conductor connective component 505 may include a threaded element that may screw into the inner threading of outer conductor connective component 508 and insulator component 507. Outer conductor connective component 508 may fit around the insulation of gripper assembly 509, thereby keeping outer conductor connective component 508 dielectrically separated from the conductive components of gripper 509. Outer conductor connective component 511 may include a threaded body, which may additionally screw into the inner threaded wall of conductive component 508. Outer conductor connective component 511 may further include an unthreaded cylindrical extrusion. Outer conductor connective component 512 may include an inner threaded body that may screw around the threading of outer conductor connective component 511.

Insulator component 503 may dielectrically separate inner conductor connective component 501 and ring terminal connector 502 from ring terminal connector 504 and outer conductor connective component 505. Insulator component 506 may be an insulator washer and insulator component 507 may be an insulator shoulder washer. Insulator component 514 may be configured to fit a housing or canopy, which may conceal a mounting bracket used for mounting the ceiling-side assembly and junction box to the ceiling. Insulator components 506, 507, and 514 may dielectrically separate outer conductor connective component 308 from the canopy and mounting bracket, each of which may have an opening. Insulator component 510 may dielectrically separate outer conductor connective component 511 from the conductive components of gripper assembly 509.

Accordingly, an assembled ceiling-side assembly 600 may provide two conductive paths dielectrically separated from one another. The first conductive path may be provided by the conductive contact between the conductive components of gripper assembly 509, inner conductor connective component 501, and ring terminal connector 502. The second conductive path may be provided by the conductive contact between outer conductor connective components 512, 511, 508, and 505, and ring terminal connector 504. The ceiling-side assembly 600 may be configured such that dielectric separation between the two conductive paths is provided by insulator components 503, 506, 507, 514, and 510, and the insulator component surrounding the housing of gripper assembly 509.

Figure 7A:
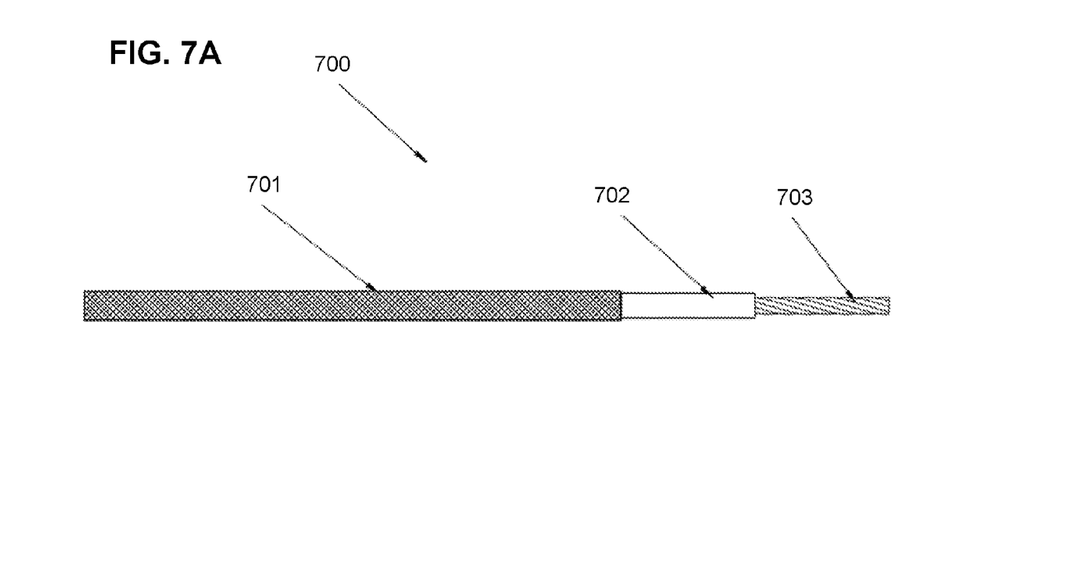
FIG. 7a is an exemplary coaxial cable used in a dual-conductor suspension system for an electrical apparatus, shown as if each layer is stripped away.

FIG. 7a may be a coaxial cable 700 shown as if each layer is stripped away or otherwise removed. Outer conductor 701 may be a mesh layer acting as a conductor, and may be copper, alloy, or a non-cuprous, highly conductive material. Insulator layer 702 may be plastic. Inner cable 703 may be an aircraft cable or other suspension cable. The inner cable may be configured in a number of different embodiments. In one embodiment of the inner cable, conductive strand comprises a plurality of conductive wires, and each of the plurality of strength strands comprises a plurality of strength wires.

Figure 7B:
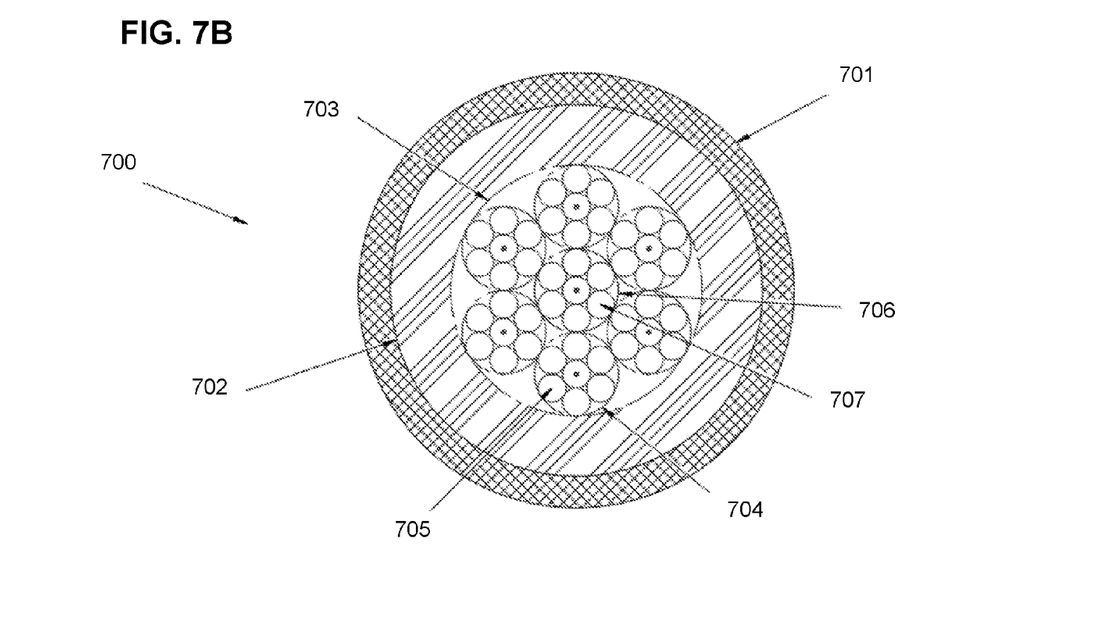
FIG. 7b is a cross-sectional view of an exemplary coaxial cable used in a dual-conductor suspension system for an electrical apparatus.

FIG. 7b is a cross sectional view of the coaxial cable 700 where inner cable 703 may be made up of six outer strands 704, with each strand containing seven wires 705, which may be made of stainless steel or other high strength material. Inner strand 706 may be a strand in the center of the outer strands 704, and may be made of seven wires 707, which may be copper or other highly conductive material. The mechanical load for this system may be applied to inner cable 703. Accordingly, insulator layer 702 may dielectrically separate inner cable 703 from outer conductor 701, which may allow separate conductive paths.

In some embodiments, at least one end of the coaxial cable may be removed such that a portion of the outer conductor 701 is available to be easily held into contact with a conductive component of an assembly. Accordingly, the outer conductor 701 may pass current directly to or from an assembly such as a fixture-mount assembly or a ceiling-mount assembly. Additionally, at least one end of the coaxial cable may be stripped such that a portion of the inner cable is available to be gripped by the ball bearings of an adjustable cable gripper. Accordingly, an inner cable held by a cable gripper may pass current to or from the ball bearings of a cable gripper.

The conductive strand may be capable of conducting low voltage electric power. The strength strands may be less conductive than the conductive strand and may have sufficient tensile strength to support a hanging luminaire assembly from the ceiling. Sufficient tensile strength may be on the order of 500 lbs. gross break weight when used with an adjustable cable gripper and a 3/32 inch diameter inner cable. The strength strands also protect the conductive strand from lateral compression forces imposed by the adjustable cable gripper. Furthermore, other electrically-powered equipment that could be powered with low voltage electricity, such as other lights, sensors, microphones, decorations, and the like, may be used with the present suspension system.

Figure 8:
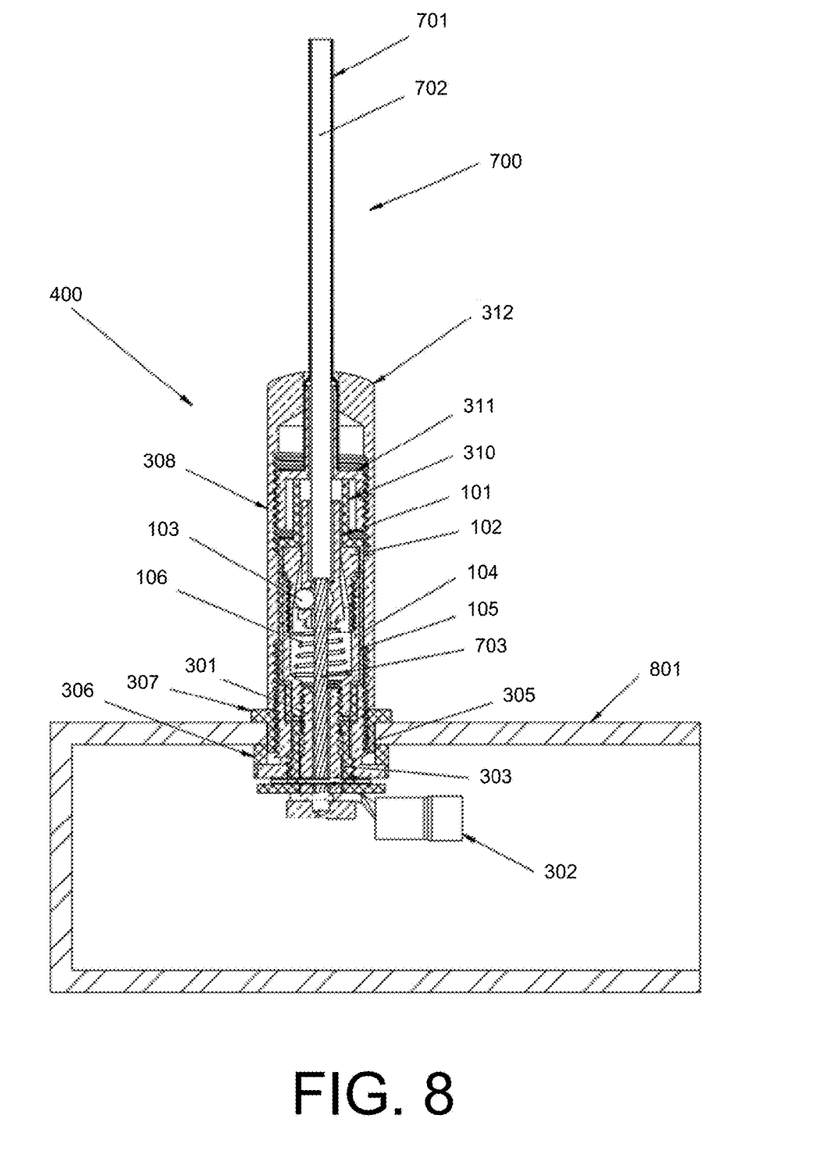
FIG. 8 is a cross sectional view of exemplary fixture-side hardware in a dual-conductor suspension system for an electrical apparatus.

FIG. 8 is a cross sectional view of the fixture-side assembly 300 with coaxial cable 700. Outer conductor 701 may wrap around the cylindrical extrusion of outer conductor connective component 311 to allow the conductive components of the fixture-side assembly 400 that are conductively connected to the negative terminal of the LED board in the luminaire fixture (i.e., outer conductor connective components 312, 311, 308, and 305 and ring terminal connector 304) to pass current to the metal components of the ceiling-side assembly that are conductively connected to a negative terminal of an LED driver in a junction box 901. Outer conductor connective component 312 may thread onto outer conductor connective component 311, which may hold the copper mesh removed from but still connected to outer conductor 701 in place. Insulator component 310 may also thread into outer conductor connective component 308. Outer conductor connective component 308 may then thread onto outer conductor connective component 305, which may contact electrical ring terminal 304. This series of connections may pass current through to ring terminal connector 304, which may have a standard insulated wire crimped on. The insulated wire may then run to an LED board or another electrical device. The outer conductor connective components may be dielectrically separated from the inner conductor and connectors by insulator components 303, 310, the insulator component surrounding the cylindrical housing of gripper assembly 309, and insulator layer 702. Insulator components 306 and 307 may insulate fixture-side assembly 300 from the fixture's housing 801.

Inner cable 703 may contact ball bearings 103, which may grip inner cable 703. Current may pass through inner cable 703 to the rest of gripper 100, which may thread onto inner conductor connective component 301, which may in turn be connected to ring terminal connector 302. This series of connections may pass current through to a wire, which may a standard insulated wire crimped onto the of ring terminal connector 302. The insulated wire may in turn run to an LED board or other electrical device. Accordingly, the series of conductive connections may pass current from the inner cable 703 to the LED board or other electrical device.

Figure 9:
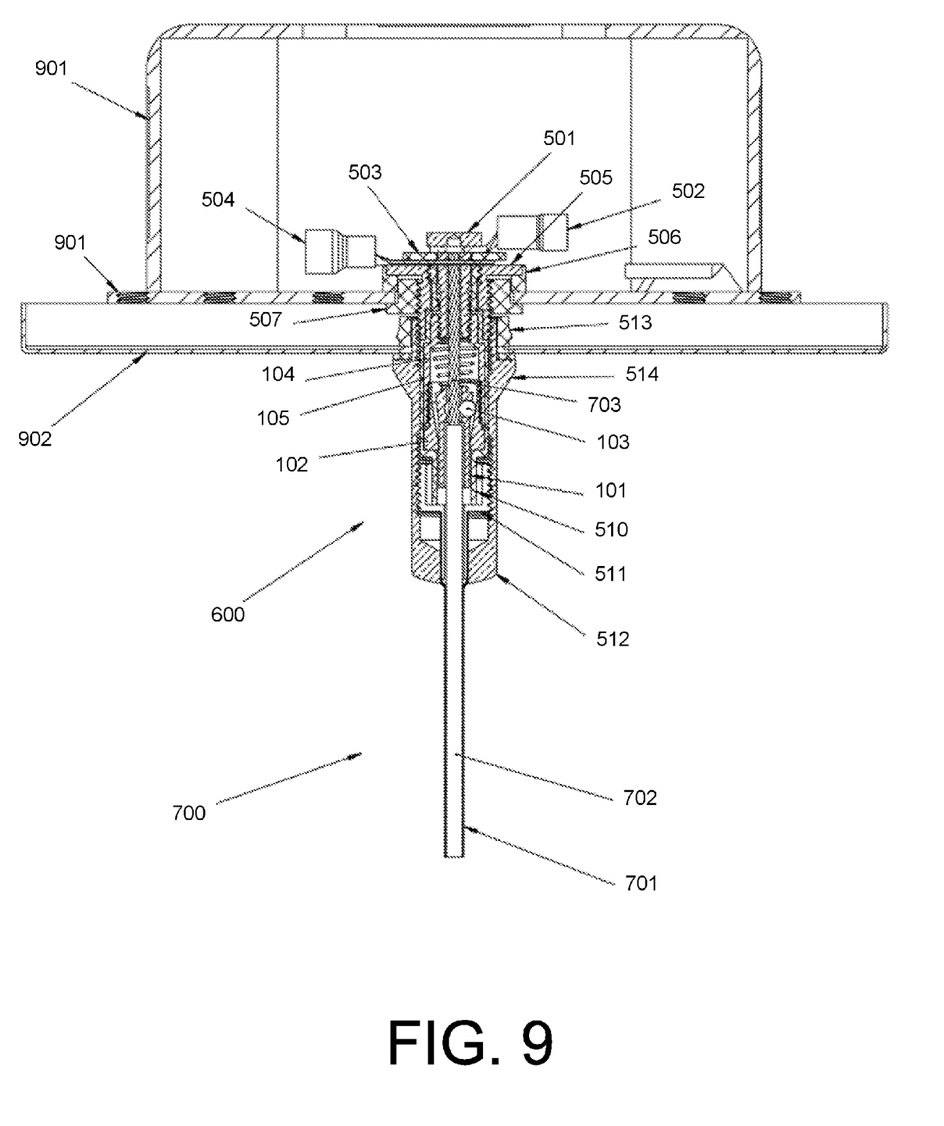
FIG. 9 is a cross sectional view of exemplary ceiling-side hardware in a dual-conductor suspension system for an electrical apparatus.

FIG. 9 is a cross sectional view of the ceiling-side assembly 600 with coaxial cable 700. The outer conductor 701 may wrap around the cylindrical extrusion outer conductor connective component 511 to allow current to pass to the outer conductor connective components 512, 511, 508, and 505. Outer conductor connective component 512 may thread onto outer conductor connective component 511 and may hold the copper mesh removed from but still connected to outer conductor 701 in place. Outer conductor connective component 511 may also thread into outer conductor connective component 508, which may in turn thread onto to outer conductor connective component 505, which may contact ring terminal connector 504. This series of connections may pass current through to a wire, which may be a standard insulated wire crimped onto ring terminal connector 504. The insulated wire may then run to the LED board or other electrical device. These components may be insulated from the inner conductor and connectors by insulators 503, 510, and 105, and by cable insulator layer 702. Insulator components 506, 507, and 514 may insulate ceiling-side assembly 600 from junction box 901, mounting bracket 902, and ceiling canopy 903.

Inner cable 703 may contact ball bearings of gripper 509, which grip cable 703. Accordingly, current may pass through 103 to the rest of the conductive components of gripper 509. Gripper 509 may thread onto inner conductor connective component 501, which may be connected to ring terminal connector 502. This series of connections may pass current through to a wire, which may be a standard insulated wire crimped onto ring terminal connector 502. The insulated wire may then run to the LED board or other electrical device.

Figure 10:
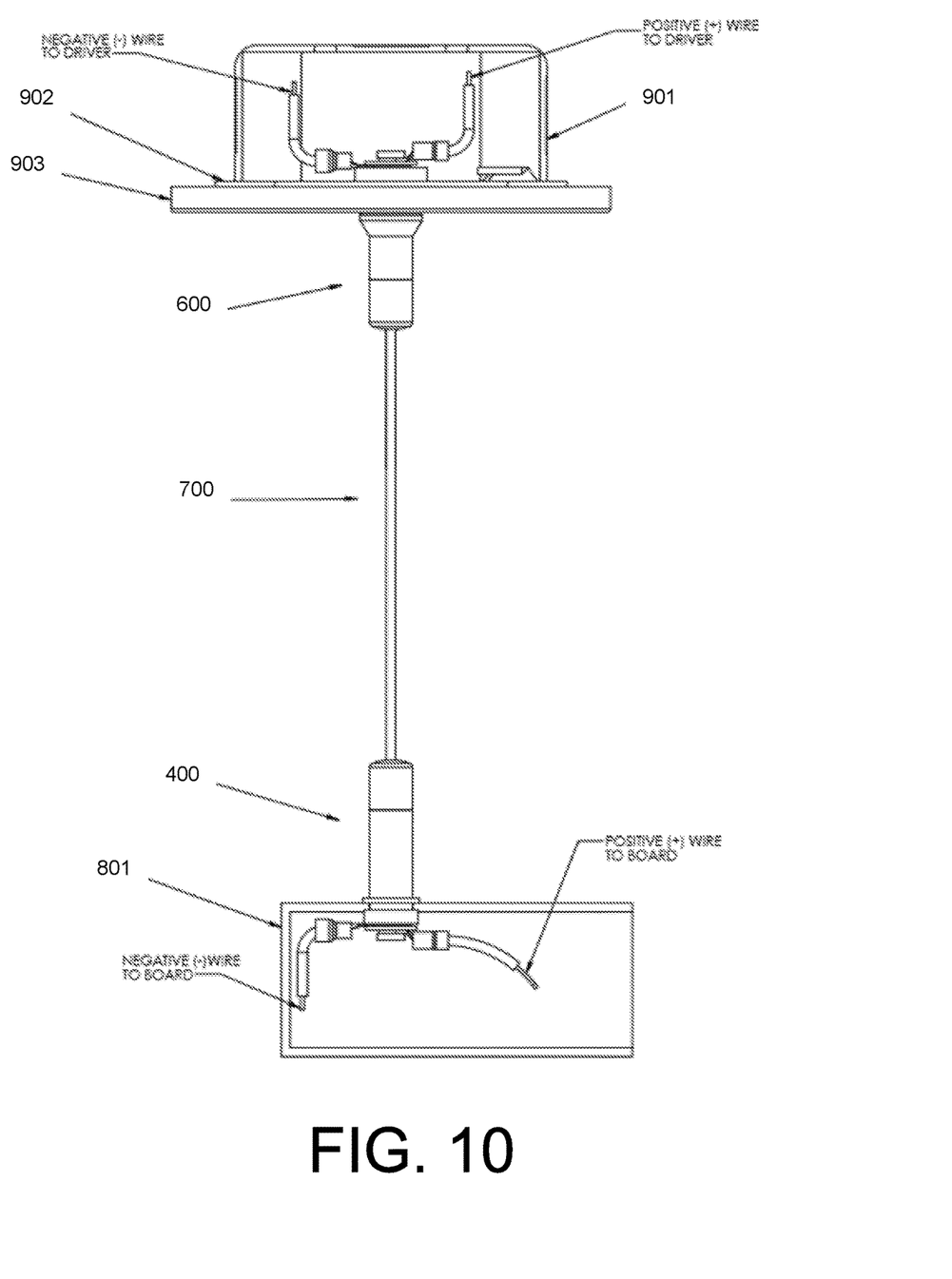
FIG. 10 shows a complete assembly of an exemplary dual-conductor suspension system for an electrical apparatus.

FIG. 10. Shows an assembly of an exemplary suspension system for an electrical apparatus. Fixture housing 801 may be connected to the fixture-side assembly 400, which may be connected to coaxial cable 700, which may be in turn connected to ceiling-side assembly 600. Mounting bracket 902 and ceiling canopy 903 may be assembled beneath junction box 901, which, in some embodiments may house an LED driver board. Accordingly, the fixture housing 801 may contain an LED circuit board in some embodiments.

Figure 11:
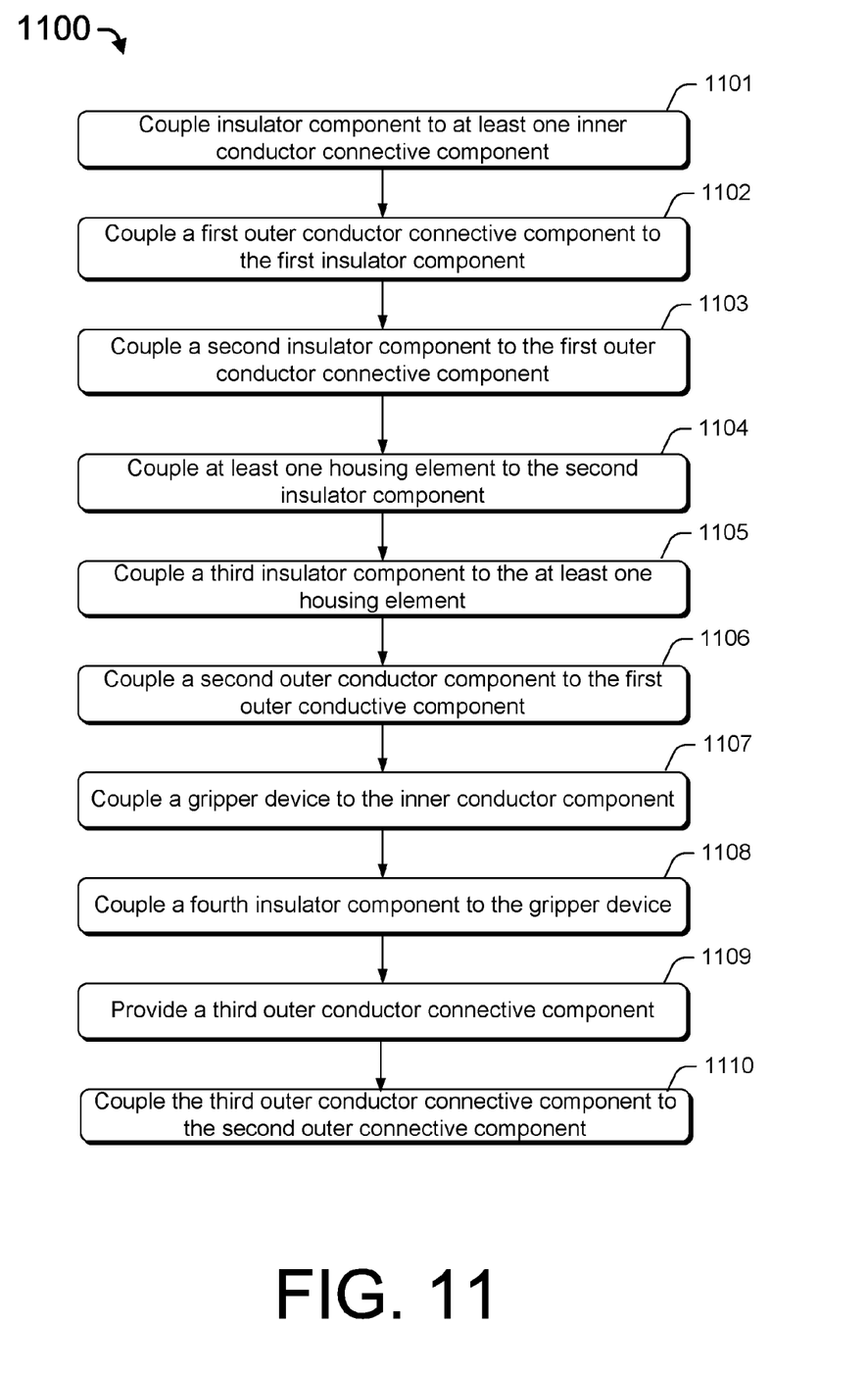
FIG. 11 is a process diagram for making a mount assembly used for suspending a luminaire fixture, such as fixture-side assembly.

FIG. 11 is a process diagram for making a mount assembly used for suspending a luminaire fixture, such as fixture-side assembly 400.

In block 1101, a first insulator component, such as insulator component 303 may be coupled to an inner conductor connective component, such as inner conductor connective component 301. The inner conductor connective component may be conductively coupled to a ring terminal connector 302 and may include a cylindrical, threaded extrusion. The insulator component 303 may be a plastic insulator with a cylindrical extrusion with a hole through which the threaded extrusion may fit.

In block 1102 the first insulator component, such as insulator component 303, may be coupled to a first outer conductor connective component, such as outer conductor connective component 305. The first outer conductor connective component may be cylindrical and have an opening, such as a circular opening extending longitudinally through the center of the first outer conductor connective component. Alternatively, a ring terminal connector, such as ring terminal connector 304, may be conductively coupled to the first outer connective component between the first outer connective component and the first insulator component.

In block 1103, the first outer conductor connective component, such as outer conductor connective component 305, may be coupled to a second insulator component, such as insulator component 306. The second insulator component may have an opening.

In block 1104, the second insulator component may be coupled to at least one housing element, such as light fixture housing 801. Each of the at least one housing element may have an opening.

In block 1105, the at least one housing element may be coupled to a third insulator component, such as insulator component 307. The third insulator component may have an opening. The first outer conductor connective component may include a threaded body onto which the third insulator component may be screwed.

In block 1106, a second outer conductor connective component, such as outer conductor connective component 308, may be coupled to the first outer conductive component, such as by placing the first outer conductor connective component through the openings of the second and third insulator component and the at least one housing element. The second outer conductor connective component may have an opening and an threaded inner wall.

In block 1107, a gripper device, such as gripper assembly 309 may be coupled to the inner conductor connective component by placing the gripper device through the openings of at least the second outer conductor connective component, the third insulator component, and the at least one housing element, and the first outer conductor connective component. The gripper device include an insulator sleeve, such as gripper insulator component 105, dielectrically separating the gripper device from at least the third insulator component. Additionally, a conductive component of the gripper device may include an inner threading into which the threaded cylindrical body of the inner conductive component may be screwed, thereby allowing current to pass between the gripper device and the inner conductor connective component.

In block 1108, the gripper device may be coupled to a fourth insulator component, such as insulator component 310. The fourth insulator component may have an opening.

In block 1109, a third outer conductor connective component, such as outer conductor connective component 311, may be provided. The third outer conductor connective component may have an opening.

In block 1110, the third outer conductor connective component may be coupled to the second outer conductor connective component by at least placing the fourth insulator component through the opening of the third outer conductor connective component. Additionally, the third outer conductor connective component may include a threaded body that may be threaded into the threaded inner wall of the second outer conductor connective component.

Accordingly, a first conductive path may be formed at least by the inner conductor connective component and the gripper device. Further, a second conductive path is formed by at least the first, second, and third outer conductor connective components. Finally, the first conductive path is dielectrically separated from the second conductive path by at least the first, second, third, and fourth insulator components.

However, some embodiments may conductively couple and fasten an inner cable to a mount assembly without a gripper. For example, the inner cable may be fastened by a method such as a clamp, screw, weld, conductive adhesive, or other method that allows the inner cable to be in conductive contact with at least one conductive component of the mount assembly. In addition, some embodiments may conductively couple and fasten the outer conductor to a mount assembly using a method other than wrapping the outer conductor around a portion of the mount assembly. For example, the outer conductor may be fastened by a method such as a clamp, screw, weld, conductive adhesive, or other method that allows the outer conductor to be in conductive contact with at least one conductive component of the mount assembly. In various embodiments, one side of a suspension cable may be fastened by a gripper device while the other side of the suspension cable is fastened by another fastening method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of making a fixture mount assembly for suspending an electrically powered assembly, the method comprising:

coupling a first insulator component to at least one inner conductor connective component;

coupling to the first insulator component a first outer conductor connective component, the first outer conductor connective component having an opening;

coupling to the first outer conductor connective component a second insulator component, the second insulator component having an opening; coupling to the second insulator component at least one housing element, each of the at least one housing element having an opening;

coupling to the at least one housing element a third insulator component, the third insulator component having an opening; coupling a second outer conductor connective component to the first outer conductive component by placing the first outer conductor connective component through the openings of the third insulator component, the at least one housing element, and the second insulator component, the second outer conductor connective component having an opening;

coupling a gripper device to the inner conductor connective component, the coupling a gripper device to the inner conductor connective component comprising: placing the gripper device through the openings of at least the second outer conductor connective component, the third insulator component, and the at least one housing element, and the first outer conductor connective component, the gripper device comprising an insulator sleeve dielectrically separating the gripper device from at least the third insulator component;

coupling to the gripper device a fourth insulator component, the fourth insulator component having an opening;

providing a third outer conductor connective component, the third outer conductor connective component having an opening; and coupling the third outer conductor connective component to the second outer conductor connective component, the coupling the third outer conductor connective component to the second outer conductor connective component comprising:

placing the fourth insulator component through the opening of the third outer conductor connective component;

wherein:

an inner conductive path is formed at least by the inner conductor connective component and the gripper device;

an outer conductive path is formed by at least the first, second, and third outer conductor connective components;

the inner conductive path is dielectrically separated from the second conductive path by at least the first, second, third, and fourth insulator components.

2. The method of claim 1, wherein the electrically powered assembly is a luminaire fixture assembly comprising a light source.

3. The method of claim 2, wherein the light source comprises at least one low voltage, low power light.

4. The method of claim 2, wherein the at least one housing element may be a housing of the luminaire fixture assembly.

5. The method of claim 1, further comprising configuring a power source to provide a positive 60-volt or less direct current feed via the inner conductive path and to provide a negative 60-volt or less direct current feed via the outer conductive path.

6. The method of claim 1, wherein the at least one inner conductor connective component comprises an electrical ring terminal connector and a threaded metal nut, and wherein coupling a gripper device to the inner conductor connective component further comprises:

screwing a threaded portion of the gripper device into the threaded metal nut such that the gripper device is in conductive contact with the electrical ring terminal connector.

7. The method of claim 1, wherein providing a conductive path from the cable to the at least one inner conductor connective component is includes configuring a plurality of ball bearings within the gripper device to apply pressure to a cable when the cable is fed through the opening of the gripper device.

8. The method of claim 1, wherein a portion of the opening of second outer conductor connective component includes a threaded wall, and the third outer connector, and the coupling the third outer conductor connective component to the second outer conductor connective component further comprises:

screwing a threaded portion of the third outer conductor connective component into the threaded wall.

9. The method of claim 1, wherein the at least one inner conductor component, and the first, second, and third outer conductor connective component are brass, and the first, second, third, and fourth insulator components are made of plastic.

10. A method of making a fixture mount assembly for suspending an electrically powered assembly, comprising:

a step for coupling a first insulator component to at least one inner conductor connective component;

a step for coupling to the first insulator component a first outer conductor connective component, the first outer conductor connective component having an opening;

a step for coupling to the first outer conductor connective component a second insulator component, the second insulator component having an opening; coupling to the second insulator component at least one housing element, each of the at least one housing element having an opening;

a step for coupling to the at least one housing element a third insulator component, the third insulator component having an opening; coupling a second outer conductor connective component to the first outer conductive component by placing the first outer conductor connective component through the openings of the third insulator component, the at least one housing element, and the second insulator component, the second outer conductor connective component having an opening;

a step for coupling a gripper device to the inner conductor connective component, the coupling a gripper device to the inner conductor connective component comprising: placing the gripper device through the openings of at least the second outer conductor connective component, the third insulator component, and the at least one housing element, and the first outer conductor connective component, the gripper device comprising an insulator sleeve dielectrically separating the gripper device from at least the third insulator component;

a step for coupling to the gripper device a fourth insulator component, the fourth insulator component having an opening;

a step for providing a third outer conductor connective component, the third outer conductor connective component having an opening; and a step for coupling the third outer conductor connective component to the second outer conductor connective component, the coupling the third outer conductor connective component to the second outer conductor connective component comprising:

a step for placing the fourth insulator component through the opening of the third outer conductor connective component;

wherein the steps form:

an inner conductive path formed at least by the inner conductor connective component and the gripper device;

an outer conductive path formed by at least the first, second, and third outer conductor connective components; and such that the inner conductive path is dielectrically separated from the second conductive path by at least the first, second, third, and fourth insulator components.

11. A fixture mount assembly for suspending an electrically powered assembly, comprising:

means for coupling a first insulator component to at least one inner conductor connective component;

means for coupling, to the first insulator component, a first outer conductor connective component such that the first outer conductor connective component has an opening;

means for coupling, to the first outer conductor connective component, a second insulator component, the second insulator component having an opening;

means for coupling, to the second insulator component, at least one housing element, the at least one housing element having an opening;

means for coupling, to the at least one housing element, a third insulator component, the third insulator component having an opening;

means for coupling a second outer conductor connective component to the first outer conductive component, the means including the placing of the first outer conductor connective component through the openings of the third insulator component, the at least one housing element, and the second insulator component, wherein the second outer conductor connective component having an opening;

means for coupling a gripper device to the inner conductor connective component by placing the gripper device through the openings of at least the second outer conductor connective component, the third insulator component, and the at least one housing element, wherein the first outer conductor connective component and the gripper device comprising an insulator sleeve dielectrically separating the gripper device from the third insulator component;

means for coupling, to the gripper device, a fourth insulator component, the fourth insulator component having an opening;

means for coupling, to the second outer conductor connective component, a third outer conductor connective component, the third outer conductor connective component having an opening; and means for coupling the fourth insulator component through the opening of the third outer conductor connective component such that:

an inner conductive path is formed at least by the inner conductor connective component and the gripper device;

an outer conductive path is formed by at least the first, second, and third outer conductor connective components; and the inner conductive path is dielectrically separated from the second conductive path by at least the first, second, third, and fourth insulator components.

12. The fixture mount assembly of claim 11, wherein the electrically powered assembly is a luminaire fixture assembly comprising a light source.

13. The fixture mount assembly of claim 12, wherein the at least one housing element is a housing of the luminaire fixture assembly.

14. The fixture mount assembly of claim 12, wherein the light source comprises at least one low voltage, low power light.

15. The fixture mount assembly of claim 11, further comprising means for configuring a power source to provide a positive 60-volt or less direct current feed via the inner conductive path and to provide a negative 60-volt or less direct current feed via the outer conductive path.

16. The fixture mount assembly of claim 11, wherein the at least one inner conductor connective component comprises an electrical ring terminal connector and a threaded metal nut, and wherein the means for coupling a gripper device to the inner conductor connective component is screwing a threaded portion of the gripper device into the threaded metal nut such that the gripper device is in conductive contact with the electrical ring terminal connector.

17. The fixture mount assembly of claim 11, further including means for forming a conductive path from a cable to the at least one inner conductor connective, the means including a plurality of ball bearings within the gripper device to apply pressure to a cable when the cable is fed through the opening of the gripper device.

18. The fixture mount assembly of claim 11, wherein a portion of the opening of second outer conductor connective component includes a threaded wall, and the third outer connector, and the means for coupling the third outer conductor connective component to the second outer conductor connective component is created by screwing a threaded portion of the third outer conductor connective component into the threaded wall.

19. The fixture mount assembly of claim 11, wherein the at least one inner conductor component, and the first, second, and third outer conductor connective component are brass, and the first, second, third, and fourth insulator components are made of plastic.

20. The fixture mount assembly of claim 11, wherein the inner conductive connective components and the outer conductor connective component of the fixture mount assembly and structure mount assembly are conductive metal.

21. The fixture mount assembly of claim 11, wherein the insulator layer and the insulator components are a non-conductive polymer.

* * * * *